US006059950A

United States Patent [19]

Dames et al.

[11] Patent Number: 6,059,950

[45] Date of Patent: May 9, 2000

[54] TRAVELLING WAVE PARTICLE SEPARATION APPARATUS

[75] Inventors: Andrew N. Dames; Nicholas A. Safford, both of Cambridge, United Kingdom

[73] Assignee: Scientific Generics Limited, Cambridge, United Kingdom

[21] Appl. No.: 08/949,322

[22] Filed: Oct. 3, 1997

Related U.S. Application Data

[63] Continuation of application No. PCT/GB96/00860, Apr. 4, 1996.

[30] Foreign Application Priority Data

Apr. 6, 1995 [GB] United Kingdom .................. 9507125

[51] Int. Cl.[7] ........................ G01N 27/26; G01N 27/447; B03C 5/02

[52] U.S. Cl. ......................... 204/547; 204/450; 204/600; 204/643

[58] Field of Search .................................... 204/547, 643, 204/600, 450

[56] References Cited

U.S. PATENT DOCUMENTS

| | | | |
|---|---|---|---|
| 3,294,237 | 12/1966 | Weston | 204/214 |
| 3,778,678 | 12/1973 | Masuda | 361/233 |
| 4,390,403 | 6/1983 | Batchelder | 204/547 |
| 4,637,392 | 1/1987 | Sorochenko | 606/50 |
| 4,970,154 | 11/1990 | Chang | 424/93.21 |
| 4,988,208 | 1/1991 | Shibuya et al. | 366/108 |
| 5,108,568 | 4/1992 | Van Alstine | 204/450 |
| 5,228,960 | 7/1993 | Liu et al. | 204/451 |
| 5,284,558 | 2/1994 | Linhardt et al. | 204/451 |
| 5,431,793 | 7/1995 | Wang et al. | 204/452 |
| 5,514,150 | 5/1996 | Rostoker | 606/159 |
| 5,653,859 | 8/1997 | Parton et al. | 204/450 |
| 5,858,192 | 1/1999 | Becker et al. | 204/547 |

FOREIGN PATENT DOCUMENTS

| | | |
|---|---|---|
| 0 519 250 | 12/1992 | European Pat. Off. . |
| 423523 | 2/1935 | United Kingdom . |
| 52-105371 | 3/1977 | WIPO . |
| 92/07657 | 5/1992 | WIPO . |
| 94/16821 | 8/1994 | WIPO . |

OTHER PUBLICATIONS

Geoghegan et al., "The Detection of Human B Lymphocytes By Both Light and Electron Microscopy Utilizing Colloidal Gold Labeled Anti–Immunoglobulin", Immunological Communcations, 7(1), No month available 1978, pp. 1–12.

Masuda et al., "Separation of Small Particles Suspended in Liquid by Nonuniform Traveling Field", IEEE Transactions on Industry Applicatins, vol. IA–23, No. 3, May/Jun. 1987 XP 000570706, pp. 474–479.

Huang et al., "Electrokietic behaviour of colloidal particles travelling electric fields: studies using yeast cells", J. Phys. D: Appl Phys. 26(1993) No month available 1528–1535.

Hagerdorn et al., "Traveling–wave dielectrophoresis of microparticles", Electrophoresis, 1992, vol. 13, pp. 49–54.

Washizu, "Electrostactic manipulation of biological objects", Journal of Electrostatics, 25 (1990) No month available pp. 109–123.

Price et al., "Applications of a new optical technique for measuring the dielectrophoretic behaviour of micro–organisms", Biochemica et Biophysica, vol. 964, (1988) pp. 221–230.

Fuhr et al. "Positioning and Manipulation of Cells and Microparticles Using Miniaturized Electric Field Traps and Travelling Waves", Sensors and Materials, vol. 7, No. 2 (No month available 1995) pp. 131–146.

Muller et al. "A traveling–wave micropump for aqueous solutions: Comparison of 1 g and $\mu$g results", Electrophoresis No month available 1993, 14, pp. 764–772.

*Primary Examiner*—Jill Warden
*Assistant Examiner*—John S. Starsiak, Jr.
*Attorney, Agent, or Firm*—Pillsbury Madison & Sutro LLP

[57] ABSTRACT

Travelling wave particle separation apparatus is provided having a flat spiral of electrodes (1,2,3,4) or a helix of similar electrodes on a cylindrical former. Only four electrical connections need to be made.

6 Claims, 2 Drawing Sheets

TRAVELLING WAVE PARTICLE SEPARATION APPARATUS

This is a Continuation of International Apln. No. PCT/GB96/00860 filed Apr. 4. 1996 which designated the U.S.

BACKGROUND OF THE INVENTION

The present invention relates to travelling wave particle separation apparatus, which may be travelling wave field migration (also known as travelling wave electrophoresis) apparatus, having an improved electrode configuration.

As described in WO94/16821, particles can be manipulated by subjecting them to travelling electric fields. Such travelling fields are produced by applying appropriate voltages to microelectrode arrays of suitable design. The microelectrodes have the geometrical form of parallel bars, which may be interrupted by spaces to form channels, as shown in FIG. 1 and may be fabricated using standard metal sputtering and photolithographic techniques as described by Price, Burt and Pethig, *Biochemica et Biophysica,* Vol.964, pp.221–230. Travelling electric fields are generated by applying voltages of suitable frequency and phases to the electrodes as described in a paper, title "Separation of small particles suspended in liquid by nonuniform travelling field", by Masuda, Washizu and Iwadare, IEEE Transactions on Industry Applications, Vol.IA-23, pp.474–480. Masuda and his coworkers describe how a series of parallel electrodes (with no channels) supporting a travelling electric field can, in principle, be used to separate particles according to their electrical charge and size (weight). Masuda et al have not however described a practical demonstration of such a particle separation method.

In a paper entitled "Travelling-wave dielectrophoresis of microparticles" by Hagedorn, Fuhr, Müller and Gimsa (Electrophoresis, Vol.13, pp.49–54) a method is shown for moving dielectric particles, like living cells and artificial objects of microscopic dimensions, over microelectrode structures and in channels bounded by the electrodes. The travelling field was generated by applying voltages of the same frequency to each electrode, with a 90° phase shift between neighbouring electrodes.

In "Electrokinetic behaviour of colloidal particles in travelling electric fields: Studies using Yeast cells" by Y Huang, X-B Wang and R Pethig J. Phys. D. Appl. Phys. 26 1993 1528–1535, an analysis supported by experiment is made of the "travelling-wave dielectrophoresis" (TWD) effect described by Hagedorn et al (paper cited above). The phenomenological equation $$\mu = -\frac{2\pi\epsilon_m r^2}{3\lambda\eta} A^2(O)\ \mathrm{Im}[f(\epsilon_p^*, \epsilon_m^*)]$$

is developed by Huang et al, to show that the TWD velocity is a function of the square of the particle radius (r), the square of the electric field strength (A(0)), the periodic length of the travelling field (λ), medium viscosity (η) and the imaginary part of the Clausius-Mossotti factor $f(\in_p^*, \in_m^*)$ defining the dielectric properties of the particle and the suspending medium in terms of their respective complex permittivities $\in_p^*$ and $\in_m^*$. This equation provides, for the first time, a practical guide for the design of travelling wave electrode systems for the manipulation and separation of particles.

Although the phenomenon in question is usually termed "travelling wave dielectrophoresis", this is something of a misnomer as the force which acts on the particles to produce translational movement is not the dielectrophoresis force but rather that which acts in electrorotation. This force is related to the imaginary component of the polarisability of the particle within its surrounding medium. However, as is discussed in more detail below, particle migration only occurs for travelling wave frequencies which produce negative dielectrophoretic forces on the particle. (Dielectrophoretic forces are related to the real component of the polarisability of the particle within its surrounding medium.) These forces are responsible for lifting the particle away from the electrodes and the channel between the electrodes. We accordingly prefer to refer to the phenomenon called previously "travelling wave dielectrophoresis" by the name "travelling wave field migration" (TWFM). To obtain TWFM, two separate criteria have to be met. First, a frequency must be selected at which the dielectrophoresis force acting on the particles is negative, ie such as to repel the particles from the electrodes. This, we have found requires the real component of the dipole moment induced in the particles to be negative.

Second, the frequency selected has to be such that the imaginary component of the dipole moment induced in the particles is non-zero (whether positive or negative) to produce a force displacing the particles along the array of electrodes.

The field conditions may also be chosen such that some particles are held by the electrodes and do not migrate or follow any bulk flow of the liquid in which they are contained whilst other particles are not held by the electrodes and are either essentially unaffected or migrate in one or other direction with respect to the field.

In travelling wave particle separation apparatus, an array of electrodes is provided forming a "ladder" along which particles may be caused to migrate under suitable field conditions or on which particles may be held. The electrodes may form a linear ladder or may be arranged as concentric circles. The phase of the voltage applied to successive electrodes will differ in a repeating pattern so that each n th electrode will be at the same phase (where n is an integer). This presents a difficulty in physically wiring the electrodes to a voltage source in that separate connections need to be provided to each electrode or to groups of electrodes in which groups each electrode is spaced from the next by n−1 electrodes belonging to other groups. If printed wiring connections are provided, there will need to be insulated crossing points.

SUMMARY OF THE INVENTION

This difficulty is avoided according to the present invention, in which there is provided travelling wave particle separation apparatus having an electrode array which comprises a plurality of continuous electrodes running side by side with one another in a path so shaped that a particle migrating transverse to the electrodes would cross each electrode repeatedly and such that the order in which the electrodes would be encountered by such a particle migrating transverse to the electrodes at each crossing thereof would be the same.

Of course it will be appreciated that the particles are not necessarily actually caused to migrate over the electrode array in the use of the apparatus.

Examples of electrode arrangements in accordance with the invention are a flat spiral, a helix of constant diameter, or a helix of decreasing diameter, i.e. a conical spiral.

The nature of the particles which are separated may vary widely. The particle may be of a size to be visible using a light microscope (a microscopic particle) or may be smaller (a sub-microscopic particle). The particle may be labelled to assist identifying or tracing it and may be detected using labels such as luminescent, fluorescent and electromagnetic radiation absorbent labels.

Examples of the former type of particle include mammalian cells, plant cells, yeast cells, plastics micro-beads, chromosomes undergoing meiosis and mitosis and oocytes.

Examples of the second type would include bacterial cells, viruses, DNA or RNA molecules, proteins, other bio-molecules, and chromosomes.

Optionally, one may treat particles to be separated to alter their field migration properties to assist separation is or so that the act of separation demonstrates that the expected alteration has occurred. Methods of altering field migration properties are described in detail in WO94/16821.

There are preferably from 2 to 10 electrodes, more preferably from 2 to 5 electrodes. As the electrodes are continuous, there is only a need to make one electrical connection per electrode for the whole apparatus and so the need for numerous or crossing connection paths is avoided.

The process of travelling wave particle separation may be carried out using an array of electrodes subjected to phased electric fields normally such that every n th (where n is an integer) electrode is in phase. As seen in FIGS. 1 and 2, every nth electrode (in-phase) is separated from the next or preceding nth electrode by a distance, and that distance defines the periodicity or pitch of the electrode. This periodicity defines the effective wave length of the travelling wave field or travelling electrical voltage produced. This wave length is optimally about ten times the average diameter of the particle to be moved under TWFM, eg from 5 to 20 times or more preferably 8 to 12 times said average diameter. For particles which are not roughly circular, it is the length in the direction transverse to TWFM movement which is of significance.

The electrodes may be formed, depending on the dimensions required, using any of the standard techniques for patterning and manufacturing microscopic structures. For example the electrodes can be produced by:

- screen printing;
- deposition of electrode material (eg by electroplating or sputter deposition) followed by one of the following patterning techniques:
  - direct writing using an electron beam followed by etching (eg wet chemical etching, dry plasma etching or focused ion beam etching);
  - writing by exposure through a photolithographically generated mask followed by etching—the mask may be generated for example by visible, ultra violet, X-ray or electron beam lithography;
  - excimer laser ablation;
- patterning followed by deposition of the electrode material (as in the X-ray LIGA process).

BRIEF DESCRIPTION OF THE DRAWINGS

The invention will be further described and illustrated with reference to the accompanying drawings, in which.

BRIEF DESCRIPTION OF THE PREFERRED EMBODIMENT

Figure 1:
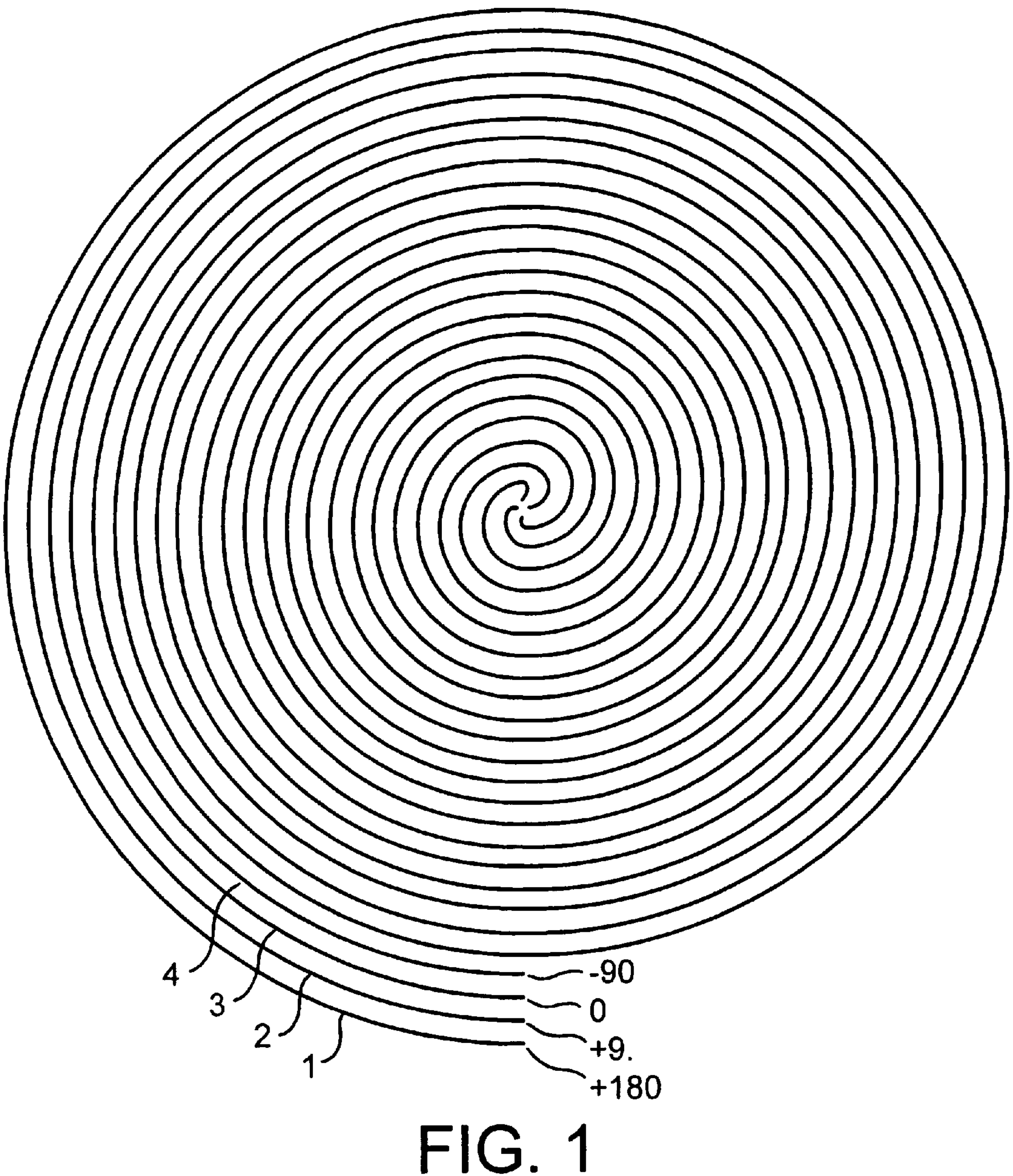
FIG. 1 shows a first arrangement of electrodes for use in the invention.

As shown in FIG. 1, a first embodiment of the invention has a flat spiral of electrodes printed on a substrate. There are four electrodes 1,2,3,4 to which are applied sinusoidal voltages of phases 90° apart, as shown. If the apparatus is run so as to cause migration of particles, the particles will migrate radially, crossing the electrodes repeatedly, but always in the order 1,2,3 and 4.

In use a sample may be applied to the whole area of the electrode and the frequency of the field may be chosen such that particles to be separated are attracted to the electrodes and are thus immobilised by the electrodes whilst other particles are repelled by the electrodes and so remain free. The free particles may be washed away. Alternatively, the field conditions may be selected such that certain particles migrate toward the centre and others migrate toward the periphery, so that the particles are separated and may be collected. A benefit of the spiral configuration is that particles migrating to the centre will be concentrated.

Figure 2:
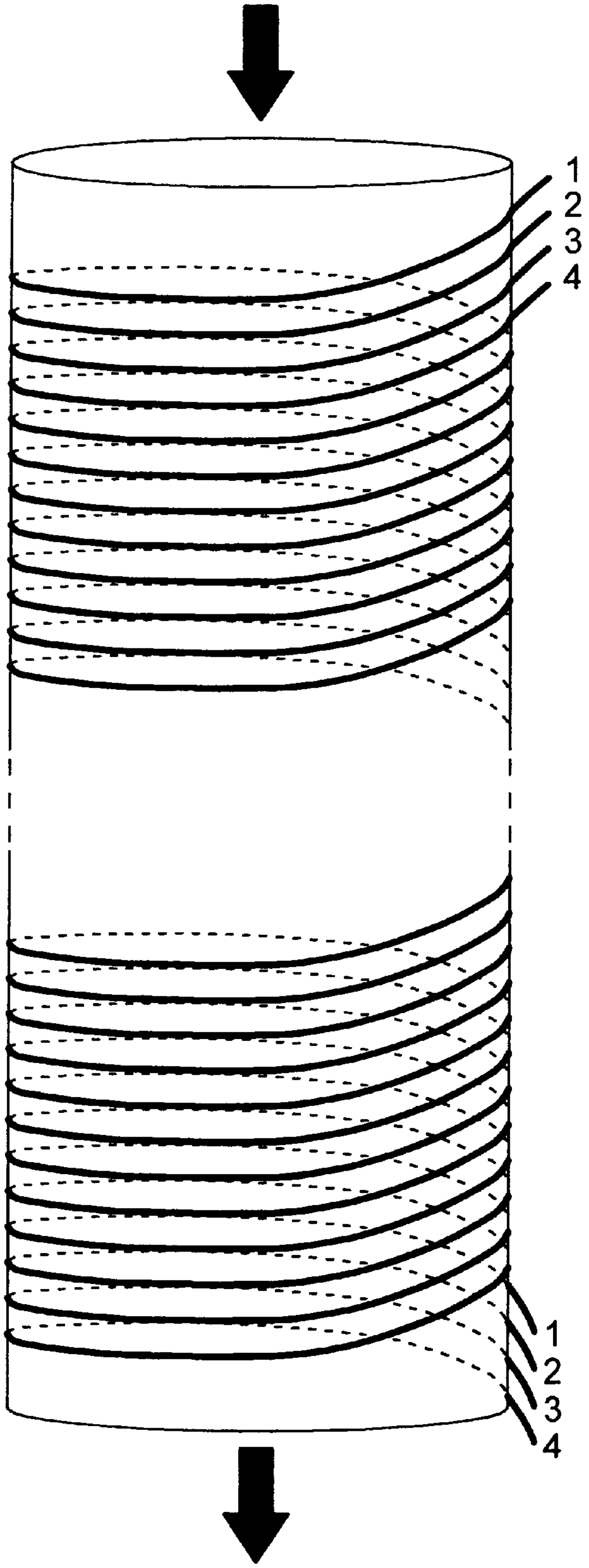
FIG. 2 shows a second arrangement of electrodes for use in the invention.

In the arrangement shown in FIG. 2, the electrodes are formed on the outer or more inner surface of a cylindrical former about which they follow a helical path. Once again, only four wiring connections are needed.

The apparatus may be used in a similar manner to the apparatus of FIG. 1. If the field conditions are selected to immobilise certain particles only, a liquid may be flowed over the electrode array axially of the helix and particles attracted to the electrodes may be harvested later by turning of the field and washing. Alternatively, the electrode array may be used as a field migration path for separating particles.

The sample volume will be limited essentially by the area of the electrode array. As compared with the electrode arrays described in WO 94/16821, the electrode arrays shown here may be constructed to handle a much larger volume. Thus whilst the earlier electrode arrays were adapted to deal with a sample volume of about 10 μl, the electrode arrays described above may be sized to accept samples of greater than 5 ml, eg up to 50 ml or more.

We claim:

1. A method of producing separation of particles from one another, comprising:

- providing an array of electrodes including a helix of continuous micro-electrodes running side by side and connected to respective differentially phased electrical voltage supplies to create a traveling electrical voltage wherein the helix decreases progressively in diameter from one end of the helix to the other;
- subjecting a plurality of particles to the influence of the travelling electrical voltage using the helix of micro-electrodes; and
- causing the particles to move over the helix of micro-electrodes array at respective velocities related to the imaginary component of their dielectric polarizability while being repelled from the micro-electrodes by dielectric forces.

2. A method as in claim 1, wherein the array of electrodes includes from 2 to 10 micro-electrodes.

3. A method of producing separation of particles from one another, comprising:

- providing an array of electrodes including a helix of continuous micro-electrodes running side by side and connected to respective differentially phased electrical voltage supplies to create a traveling electrical voltage wherein each of said continuous micro-electrodes has a pitch and said pitch is from 5 to 20 times the average diameter of said particles;
- subjecting a plurality of particles to the influence of the travelling electrical voltage using the helix of micro-electrodes; and causing the particles to move over the helix of micro-electrodes array at respective velocities related to the imaginary component of their dielectric polarizability while being repelled from the micro-electrodes by dielectric forces.

4. A travelling wave apparatus for separating particles from one another, comprising:

an electrode array including a plurality of continuous micro-electrodes running side by side in a helix wherein said helix decreases progressively in diameter from one end of the helix to the other;

a source of electric current adapted and connected to apply to said micro-electrodes an electric current of phased voltage and generally equal frequency such that said voltage applied to each of said micro-electrodes of said plurality is differentially phased with respect to said voltage applied to the other of said micro-electrodes in said plurality; and said frequency being selected to repel the particles from said micro-electrodes by dielectric forces and so that the imaginary component of the dipole moment induced in the particles is non-zero, whereby the particles are displaced along said electrode array.

5. A travelling wave particle separation apparatus as in claim 4, wherein said plurality of micro-electrodes includes from 2 to 10 micro-electrodes.

6. A travelling wave apparatus for separating particles from one another, comprising:

an electrode array including a plurality of continuous micro-electrodes running side by side in a helix wherein each of said continuous micro-electrodes has a pitch and said pitch is from 5 to 20 times the average diameter of said particles;

a source of electric current adapted and connected to apply to said micro-electrodes an electric current of phased voltage and generally equal frequency such that said voltage applied to each of said micro-electrodes of said plurality is differentially phased with respect to said voltage applied to the other of said micro-electrodes in said plurality; and said frequency being selected to repel the particles from said micro-electrodes by dielectric forces and so that the imaginary component of the dipole moment induced in the particles is non-zero, whereby the particles are displaced along said electrode array.

* * * * *